US005813805A

United States Patent [19]

Kopras

[11] Patent Number: 5,813,805

[45] Date of Patent: Sep. 29, 1998

[54] SPIRAL CUTTING TOOL WITH DETACHABLE HANDLE

[76] Inventor: Robert K. Kopras, 4524 Bluemounds Trail, Black Earth, Wis. 53515

[21] Appl. No.: 705,254

[22] Filed: Aug. 29, 1996

[51] Int. Cl.$^{6}$ .......... B23B 39/00

[52] U.S. Cl. .......... 408/241 R; 16/114 R; 81/177.4; 409/181

[58] Field of Search .......... 16/114 R; 81/177.4, 81/490; 409/181, 182; 408/241 R

[56] References Cited

U.S. PATENT DOCUMENTS

| | | | |
|---|---|---|---|
| 4,653,356 | 3/1987 | Golden | 81/177.4 |
| 4,932,294 | 6/1990 | Chang | 81/490 |
| 4,938,642 | 7/1990 | Imahashi et al. | 409/182 |
| 5,074,081 | 12/1991 | Beth et al. | 16/114 R |
| 5,257,654 | 11/1993 | Bean et al. | 409/182 |
| 5,265,657 | 11/1993 | Matsumoto et al. | 409/182 |
| 5,445,479 | 8/1995 | Hillinger | 408/241 R |

FOREIGN PATENT DOCUMENTS

| | | | |
|---|---|---|---|
| 56313 | 5/1981 | Japan | 408/241 R |

OTHER PUBLICATIONS

Brochure by Roto Zip Tool Corporation for Roto Mite, published at various times prior to 1996.

*Primary Examiner*—Daniel W. Howell
*Assistant Examiner*—Adesh Bhargava
*Attorney, Agent, or Firm*—Foley & Lardner

[57] ABSTRACT

A detachable handle is provided on hand-held power tools, such as spiral cutting tools, in which cuts are made by positioning the axis of the cutting tool motor housing perpendicular to a workpiece surface, and moving a cutting tool bit through the workpiece in a direction perpendicular to the axis of the bit to remove material from the workpiece. A gripping surface of the detachable handle is aligned substantially parallel with the axis of the cutting tool housing. The detachable handle allows a cutting tool to be grasped firmly and comfortably with two hands, with one hand grasping the detachable handle and the other hand grasping the housing of the cutting tool to improve cutting accuracy and reduce user fatigue. The cutting tool housing is preferably provided with lugs extending therefrom, whereby the detachable handle may be detachably attached to the cutting tool. Threaded knobs are passed through mounting holes in ends of the detachable handle and threaded into holes in the housing lugs to detachably secure the handle to the lugs. The detachable handle is preferably formed to include one or more storage compartments therein, accessible through apertures in the handle, for storage of additional cutting tool bits, cutting tool accessories, etc. A sliding door on the detachable handle may be provided to allow access to the storage compartments, and to close the compartments to secure items stored therein during operation of the cutting tool.

23 Claims, 4 Drawing Sheets

SPIRAL CUTTING TOOL WITH DETACHABLE HANDLE

FIELD OF THE INVENTION

This invention pertains generally to hand-held power tools such as spiral cutting tools, and more particularly to handles for such power tools.

BACKGROUND OF THE INVENTION

A spiral cutting tool is a hand-held power tool having an electric motor that rotates a spiral cutting tool bit at high speeds. The spiral cutting tool bit includes a sharp cutting edge that is wrapped in a spiral around the axis of the bit. The spiral cutting tool bit is designed for cutting perpendicular to the axis of the bit. The electric motor that drives the bit is enclosed in a motor housing. The motor housing is generally cylindrical in shape, with the spiral cutting tool bit extending from one end of the motor housing along the axis of the housing. A spiral cutting tool is used to remove material from a workpiece by moving the rotating spiral cutting tool bit through the workpiece in a direction perpendicular to the axis of rotation of the bit. A spiral cutting tool is conventionally operated by grasping the motor housing with one or both hands, turning on the electric motor to begin high speed rotation of the spiral cutting tool bit, plunging the spinning spiral cutting tool bit into a work piece, such as a piece of wood, and then moving the cutting bit through the workpiece in a direction perpendicular to the axis of the spiral cutting tool bit by moving the motor housing in a direction parallel to the plane of the workpiece surface while keeping the axis of the motor housing generally perpendicular to the workpiece surface.

Precise control of a cut being made by the spiral cutting tool is dependent upon the cutting tool operator maintaining a firm grasp on the motor housing. With extended and continuous operation, the motor housing can become warm, and cutting tool vibrations may cause an operator's hands and arms to become fatigued. Extended and continuous use of a spiral cutting tool by grasping the motor housing can, therefore, become uncomfortable, reducing the ability of the cutting tool operator to precisely control the cut being made.

Spiral cutting tool bits of various sizes and specifically designed for the cutting of different workpiece materials are available. A spiral cutting tool operator will likely desire to have extra bits conveniently at hand. Spiral cutting tool bits are changed by removing and inserting bits from and into a chuck whereby the bits are attached to the spiral cutting tool motor. This process typically requires use of a wrench or other tool which a spiral cutting tool operator will also desire to keep easily accessible. Extra spiral cutting tool bits and other spiral cutting tool accessories may be brought to a work site in a toolbox or other conventional storage container, wherein they will likely become mixed up with other tools, and accessories for other power tools, such as conventional drill bits. This can result in wasted time as the spiral cutting tool operator searches through his tool box for the desired spiral cutting tool bit, wrench, etc. It would typically not be practical to bring a separate container to the work site for spiral cutting tool bits and accessories alone.

SUMMARY OF THE INVENTION

The present invention provides a detachable handle for spiral cutting tools and other similar hand-held power tools. The present invention provides for extensive continuous use of the power tool while maintaining operator comfort and cutting tool control. The handle of the present invention includes a gripping surface for an operator's hand which is substantially parallel with the axis of the power tool housing. Control of the cutting tool is maintained by grasping the tool with two hands, one on the handle, the other on the power tool housing. The handle facilitates positioning the power tool with its axis perpendicular to the workpiece, and moving the power tool along the plane of the workpiece in a direction perpendicular to the axis of the power tool.

The handle of the present invention is preferably attached to the motor housing of a spiral cutting tool and is detachable therefrom. The handle may be securely attached to the spiral cutting tool when the tool is to be used for extended periods of time, or generally to enhance the operator's comfort and control in using the spiral cutting tool, and may be remcived therefrom, for example, when the spiral cutting tool is to be used in tight quarters wherein the handle might become an obstacle to precise control of the spiral cutting tool. For purposes of securely attaching the handle, the motor housing preferably includes integrally formed lugs that extend from the motor housing. Threaded holes provided in the handle lugs may be aligned with mounting holes through ends of the detachable handle. The handle is secured to the lugs by threaded knobs that are inserted through the mounting holes in the ends of the handle and tightly threaded into the threaded holes in the handle lugs on the motor housing. The threaded knobs are preferably designed so that the detachable handle may be tightly secured to the handle lugs by hand, without the need for a wrench or other tool.

The detachable handle is preferably made from a hard and strong plastic material, such as glass filled nylon. The detachable handle may be formed by molding the handle in essentially symmetric handle halves. The handle halves may then be joined together using screws and/or an adhesive to form the complete detachable handle. To provide a light weight handle, and to minimize the amount of material required to form the handle, the detachable handle is preferably formed to be substantially hollow. Structural elements formed within the handle provide structural support to the handle. The detachable handle is thus simultaneously lightweight while being rigid and strong. The structural elements within the handle also divide the inside of the handle into various compartments or chambers. Some of the compartments formed by the structural elements within the handle may be used to store various spiral cutting tool accessories, such as extra spiral cutting tool bits. The handle compartments are made accessible through apertures in the outer wall of the detachable handle. A compartment cover, such as a sliding door, may be provided to cover the openings into the handle compartments. The sliding door may be opened to access the handle compartment, and closed to keep articles inserted into the handle compartment securely contained therein. A separate compartment in the detachable handle may be specifically designed to hold a wrench used in changing spiral cutting tool bits.

The detachable handle of the present invention allows a spiral cutting tool operator to better control the cutting tool to make precise cuts. The detachable handle also facilitates an operator's use of the cutting tool for longer durations without experiencing discomfort, fatigue, or loss of control of the cutting tool. The detachable handle insulates the operator from some of the cutting tool vibration, as well as heat generated within the cutting tool motor housing. The handle is both easily attachable to and detachable from the motor housing. This allows the handle to be removed for operation of the spiral cutting tool in close quarters by grasping the cutting tool by the motor housing alone. The detachable handle is structurally sound, and yet does not add significant weight to the cutting tool as a whole. The structure of the detachable handle allows spiral cutting tool accessory storage compartments to be incorporated into the handle. Thus, cutting tool accessories and extra spiral cutting tool bits may always be kept conveniently at hand.

Further objects, features, and advantages of the invention will be apparent from the following detailed description of the invention taken in conjunction with the accompanying drawings.

DETAILED DESCRIPTION OF THE INVENTION

Figure 1:
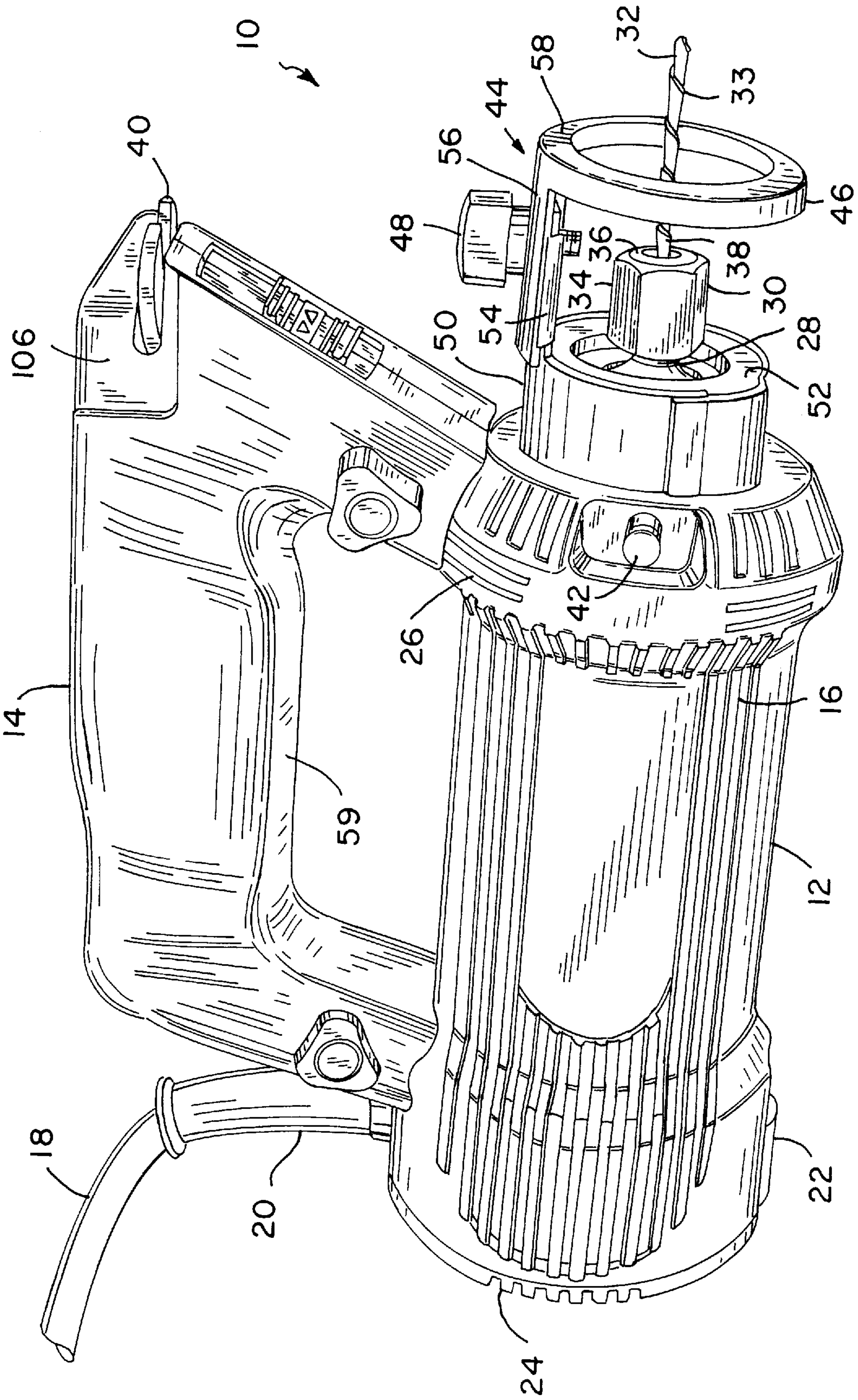
FIG. 1 is a perspective view of a spiral cutting tool including a detachable handle in accordance with the present invention.

A spiral cutting tool with a detachable handle in accordance with the present invention is shown generally at 10 in FIG. 1. The spiral cutting tool 10 includes a motor housing 12 to which the detachable handle 14 is attached. The motor housing 12 is made of an electrically insulating material, such as hard plastic. The motor housing 12 is generally cylindrical in shape and includes raised gripping surfaces 16 that allow a firm grip on the cutting tool 10 to be maintained when the cutting tool 10 is grasped around the motor housing 12.

An electric motor (not visible in FIG. 1) is enclosed within the motor housing 12. An exemplary electric motor that may be employed is a conventional 4 amp 115–120 V, AC electric motor with a no-load rotation speed of 30,000 RPM. The motor receives electrical power through an electrical cord 18 (only a portion of which is shown in FIG. 1). The electrical cord 18 may preferably include a rubber cover that stays flexible in cold operating environments. A thick rubber connecting sleeve 20 is preferably provided where the electrical cord 18 is joined to the motor housing 12. This connecting sleeve 20 provides strain relief at the end of the electrical cord 18 to prevent crimping, cracking, and excessive wear of the cord 18 where it is joined to the cutting tool 10. The electric motor is turned on and off by an on/off switch 22 on the motor housing 12. The electric motor of the cutting tool 10 drives a motor shaft. A fan, located within the motor housing 12, is preferably attached to the motor shaft. When the motor is turned on, by means of the on/off switch 22, the fan is rotated at a high speed to draw air through the motor housing 12 and across the electric motor to thereby cool the motor. For this purpose, intake air vents 24 and exhaust air vents 26 are preferably provided in the motor housing 12. Cool air is thus drawn by the motor fan into the motor housing 12 through the air intake vents 24 to cool the electrical motor, with warm air exhausted from the motor housing 12 through the exhaust air vents 26.

An end 28 of the motor shaft extends from one end of the motor housing 12 along the axis thereof. Attached to the end of the motor shaft 28 is a mechanical structure 30 for securing a spiral cutting tool bit 32 to the motor shaft 28. The spiral cutting tool bit 32 has a cutting edge 33 spiraled around the axis of the bit 32. This cutting edge 33 is designed such that the spiral cutting tool bit 32, when rotated at high speed, will cut through a workpiece in a direction perpendicular to the axis of the bit 32. In this cutting process, significant force is applied to the cutting tool bit 32 perpendicular to the axis thereof. Thus, although a conventional drill type chuck may be used for the structure 30 that mechanically connects the bit 32 to the motor shaft 28, the preferred structure for securing the bit 32 to the shaft 28 is a collet type system 30. The collet bit attachment system 30 includes a collet nut 34 and a collet 36 centered axially within a central aperture of the collet nut 34. The collet nut 34 is mounted on a threaded end of the motor shaft 28. To secure the bit 32 to the motor shaft 28, a shank 38 of the bit 32 is inserted into the central aperture of the collet 36. The collet nut 34 is then tightened, first by hand and then with a wrench 40, until the bit 32 is held securely. As the collet nut 34 is tightened down on the threaded end of the shaft 28, the collet 36 is compressed within the collet nut 34 between a partially closed end of the collet nut 30 and the shaft 28. The collet 36 is slotted and has tapered ends such that when the collet 36 is compressed between the collet nut 34 and the shaft 28 the collet is compressed radially, causing the central aperture of the collet 36 to close tightly around the shank 38 of the spiral cutting tool bit 32. To remove the bit 32 from the motor shaft 28, the collet nut 34 is loosened, using the wrench 40, until the bit 32 can be easily removed from the central aperture of the collet 36.

A shaft lock pin 42 is used to prevent rotation of the motor shaft when the collet nut 34 is being loosened and tightened. The shaft lock pin 42 extends through the motor housing 12. When the shaft lock pin 42 is depressed, it engages the motor shaft 28, preventing rotation of the shaft, and allowing the collet nut 30 to be loosened and tightened. When the shaft lock pin 42 is released, a spring (not shown) attached to the shaft lock pin 42 causes the shaft lock pin 42 to become disengaged from the motor shaft 28, allowing free rotation thereof.

To set the depth of cut to be made by the spiral cutting tool 10, an adjustable depth guide assembly 44 is provided. The depth guide assembly 44 includes a depth guide 46, a threaded locking knob 48, and a depth guide bracket 50. The depth guide bracket 50 is attached to the cutting tool housing 12 around the location where the motor shaft 28 emerges from the housing 12. The depth guide bracket 50 may be attached to the housing 12 in various conventional manners. Preferably, the depth guide bracket 50 may be made detachable from the housing 12. A housing collar 52, which is part of and extends axially from the motor housing 12, may be provided around the motor shaft 28. The collar 52 includes a recessed channel (not shown) around an outer circumference thereof which interlocks with a protrusion on the depth guide bracket 50. To attach the depth guide bracket 50 to the collar 52, the protrusion on the depth guide bracket 50 is aligned with a notch in the collar 52, and the bracket 50 is pushed down over the collar 52 until the protrusion on the bracket 50 is located within the collar channel. The depth guide bracket 50 is then rotated around the collar 52 to lock the protrusion on the bracket 50 within the channel on the collar 52. A metal band (not shown) may be placed in a second channel in the outer circumference of the housing collar 52. This metal band has a protrusion which can be compressed, and thus acts as a spring. A hole (not shown) is provided in the depth guide bracket 50 which may be aligned with the spring protrusion from the housing collar 52. When the bracket 50 is rotated about the collar 52 to lock the protrusion on the bracket 50 within the channel in the collar 52, the protrusion on the spring is aligned with the hole in the bracket 50, causing the protrusion to spring into the hole, thereby securely locking the depth guide bracket 50, and the entire depth guide assembly 44, onto the housing collar 52 and the housing 12.

The depth guide bracket 50 includes an extension 54 extending in an axial direction from an edge thereof. The extension 54 includes a threaded hole into which the threaded depth guide locking knob 48 may be threaded. The depth guide 46 includes a corresponding extension 56 extending in an axial direction from an edge thereof, and which is aligned with the extension portion 54 of the depth guide bracket 50. The axially extending portion 54 of the depth guide bracket 50 preferably includes a flange guide section extending along the sides thereof to help keep the axially extending portion 56 of the depth guide 46 aligned on the same axis with the axially extending portion 54 of the depth guide bracket 50. The axially extending portion 56 of the depth guide 46 includes an axial slot along its length. The threaded shaft of the depth guide locking knob 48 passes through the slot in the axially extending portion 56 of the depth guide 46. The depth of cut may be set by loosening the locking knob 48, moving the depth guide 46 in an axial direction by sliding the axially extending portion 56 thereof along the axially extending portion 54 of the depth guide bracket 50 (with the slot in the axially extending portion 56 of the depth guide 46 sliding around the threaded portion of the depth guide locking knob 48), and then tightening the depth guide locking knob 48 into the hole in the axially extending portion 54 of the depth guide bracket 50 and down upon the axially extending portion 56 of the depth guide 46 to lock the depth guide 46 in position on the depth guide bracket 50. Note that a locking washer (not shown) may preferably be placed around the threaded portion of the locking knob 48, between a head portion of the locking knob 48 and the axially extending portion 56 of the depth guide 46, to more securely fix the depth guide 46 in place when the locking knob 48 is tightened down upon the axially extending portion 56 thereof. When locked into position, the depth guide 46 provides a depth guide surface 58 which lies in a plane perpendicular to the axis of the spiral cutting tool bit 32.

The detachable handle 14 of the present invention is preferably attached to the motor housing 12 of the cutting tool 10. The handle 14 includes a gripping surface 59 which is preferably contoured in shape so that the handle 14 may be comfortably grasped in the hand of an operator of the cutting tool 10. The handle gripping surface 59 is aligned substantially parallel with the axis of the cutting tool housing 12. It should be understood that the terms "substantially parallel", as used in this context throughout this specification and accompanying claims, means "more parallel than not". Therefore, the angle of the handle gripping surface 59 with respect to the axis of the cutting tool 10 may be varied from exactly parallel by several degrees. However, as the handle gripping surface 59 becomes more and more perpendicular to the axis of the motor housing 12, the effectiveness of the handle 14 for accurately controlling the type of cuts made by the spiral cutting tool 10 is reduced.

The handle 14 of the present invention allows the cutting tool 10 to be grasped more firmly and comfortably with both hands, to provide greater control of the cutting tool 10 during operation, and to thereby provide for more accurate cuts with less operator fatigue. The handle 14 also allows the cutting tool 10 to be grasped more firmly during motor start-up, during which the reaction torque of the cutting tool motor can cause the tool 10 to twist. Thus, the cutting tool handle 14 also facilitates safe use of the cutting tool 10. It may be desirable, however, that the cutting tool handle 14 be detached for some applications. For example, for making cuts in close quarters or obstructed areas, the handle 14 may become an obstruction, and actually interfere with the making of accurate cuts. Thus, it is desirable to provide both for securely attaching the handle 14 to the cutting tool 10 when needed, while allowing the handle 14 to be detached when its use would interfere with accurate or safe operation of the cutting tool 10.

Figure 2:
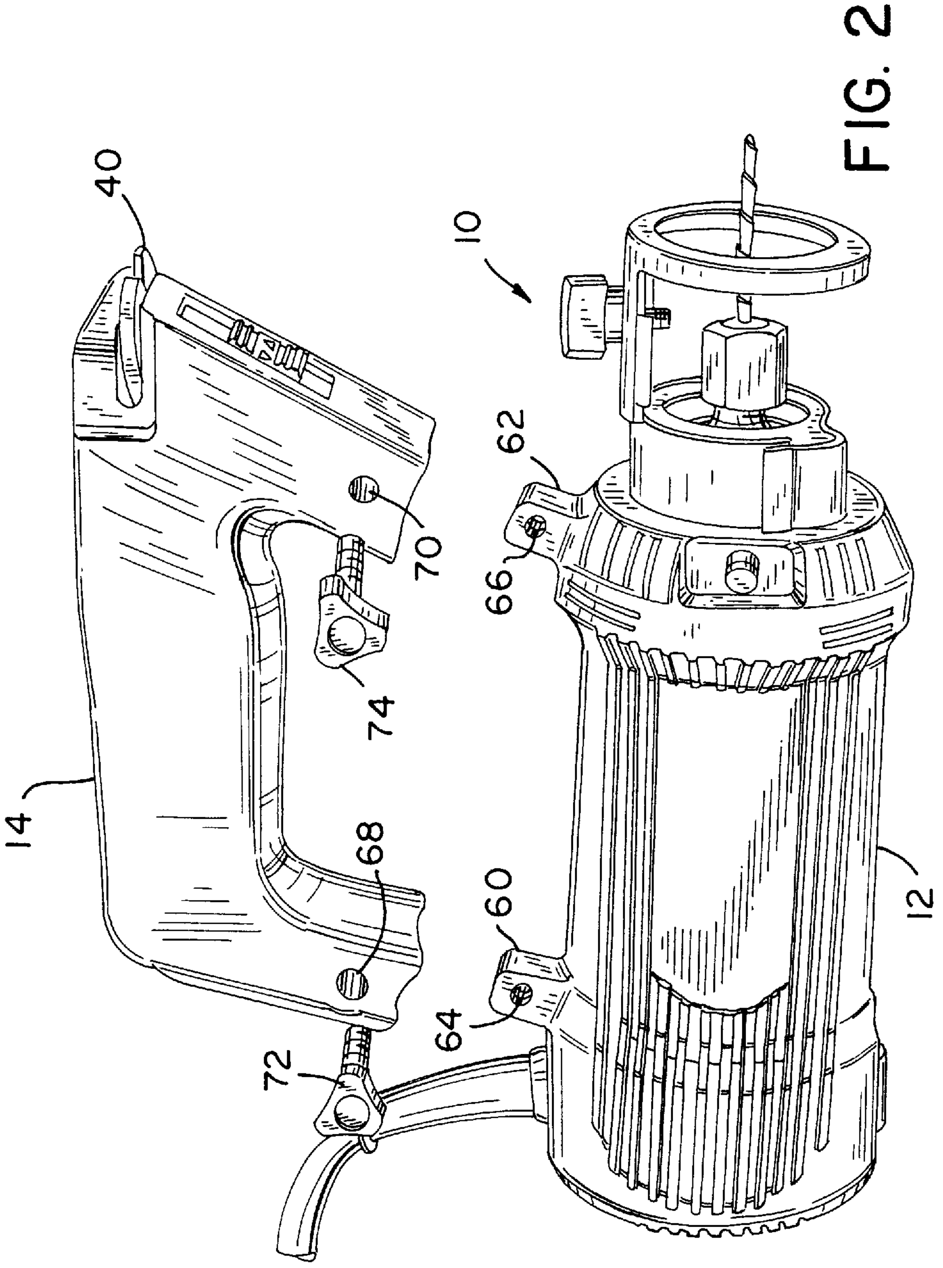
FIG. 2 is a perspective view of a spiral cutting tool showing the detachable handle of the present invention removed therefrom.

A preferred structure for attaching the handle 14 to the cutting tool 10 is described in detail with reference to FIG. 2. Note that other similar structures, and variations on the structures described, may also be used for detachably attaching the detachable handle 14 to the cutting tool 10. Handle lugs 60 and 62 extend from the motor housing 12 of the cutting tool 10. The handle lugs 60 and 62 are preferably integrally formed extensions of the housing 12. The lugs 60 and 62 preferably do not extend so far from the housing 12 so as to interfere with operation of the cutting tool 10 when the handle 14 is detached therefrom. A threaded hole 64 or 66 is provided through each of the lugs 60 and 62. Since the housing 12 is made of an electrically insulating material, such as hard plastic, merely threading the holes 64 and 66 through the integrally formed lugs 60 and 62 will create threads which may become easily stripped and are subject to premature wear. To provide durable threading in the lug holes 64 and 66, the threading may be provided on the central aperture of a thick metal washer or nut (not shown in FIG. 2) which is fixed within the lugs 60 and 62. (The threaded central aperture of the washer or nut would, of course, be aligned with the holes 64 and 66.)

The handle 14 is attached to the housing 12 by placing ends of the handle 14 over the lugs 60 and 62. The lugs 60 and 62 are thus inserted into the hollow handle ends. Mounting holes 68 and 70 in the handle ends are aligned with the holes 64 and 66 in the lugs 60 and 62. Threaded locking knobs 72 and 74 are inserted through the mounting holes 68 and 70 in the ends of the handle 14 and into the threaded holes 64 and 66 in the lugs 60 and 62. The knobs 72 and 74 are then tightened to secure the handle 14 to the housing 12. Preferably, the heads of the locking knobs 72 and 74 are designed so that the locking knobs 72 and 74 may be tightened by hand, without need for a separate tool such as a wrench or screw driver.

To detach the handle 14 from the housing 12, the described procedure is simply reversed. The locking knobs 72 and 74 are loosened and removed from the holes 64 and 66 in the lugs 60 and 62 and the mounting holes 68 and 70 in the ends of the handle 14. The handle 14 is then removed from the handle lugs 60 and 62.

Figure 4:
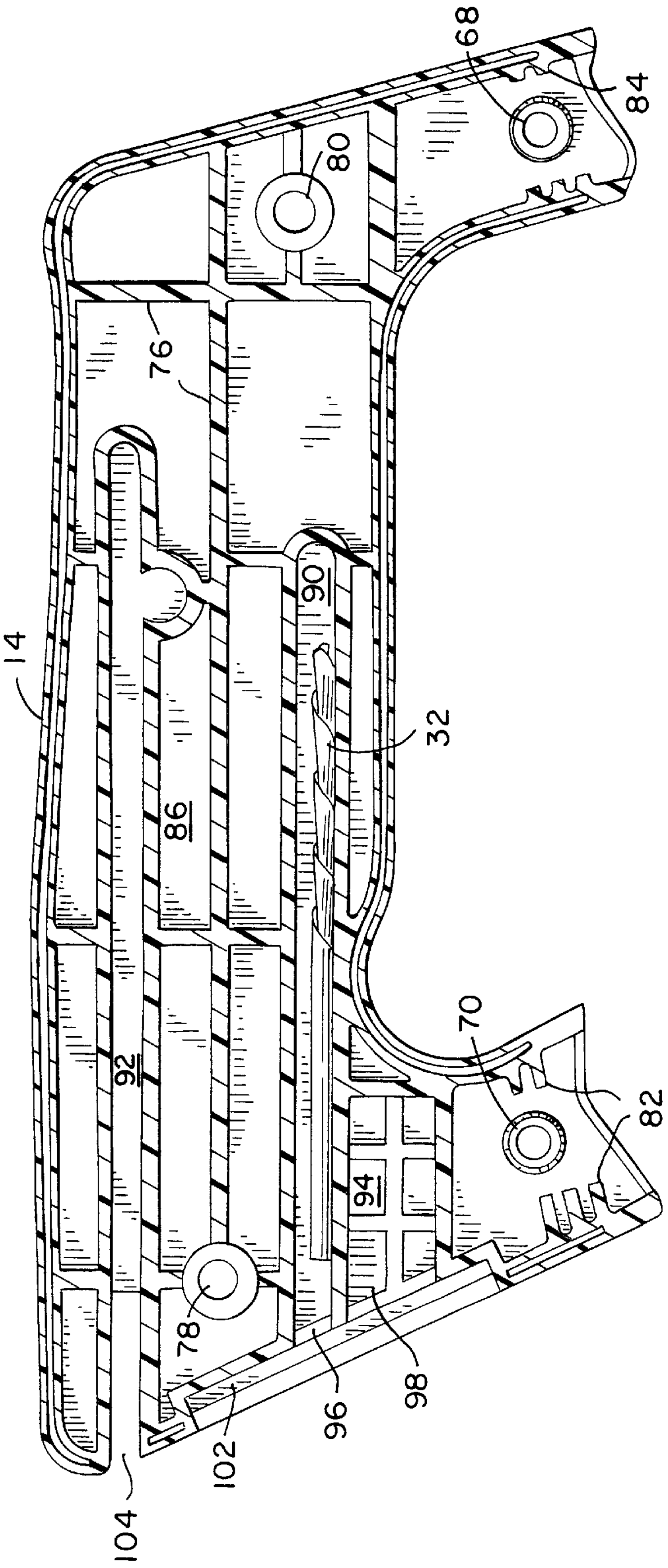
FIG. 4 is a cross-sectional view of a detachable handle in accordance with the present invention as taken generally along the line 4—4 of FIG. 3.

The detachable handle 14 of the present invention is preferably made of an electrically insulating material such as hard plastic. A preferable material for forming the handle 14 is glass filled nylon. The handle 14 may be formed of such a material in two complementary and symmetric halves by a conventional molding process. The two halves are then joined together to form the complete handle 14. One half of such a molded plastic handle 14 is illustrated in FIG. 4. As illustrated, the handle 14 is substantially hollow, but includes molded structural elements 76 which provide strength and rigidity to the handle 14. The internal structural elements 76 of the handle 14 give the handle 14 the strength and rigidity of a solid handle, without requiring the amount of material required to form a solid handle, and with the light weight of a substantially hollow handle. Minimizing the weight of the handle 14 in this manner helps to minimize the fatigue experienced by an operator using the cutting tool 10 with the handle 14 in place.

Two handle halves are joined together to form the complete handle 14. The two handle halves may be joined together in a conventional manner, for example, using an adhesive. The two handle halves are also preferably screwed together. For this purpose, screw holes 78 and 80 may be formed in the handle halves.

Structural elements 82 and 84 around the holes 68 and 70 in the ends of the handle 14 facilitate placement of the handle 14 over the handle lugs 60 and 62. These structural elements 82 and 84 extend from the inner wall of the handle 14, allow the handle ends to be snugly placed on the lugs 60 and 62, and facilitate alignment of the mounting holes 68 and 70 in the handle ends with the holes 64 and 66 in the lugs 60 and 62.

Figure 3:
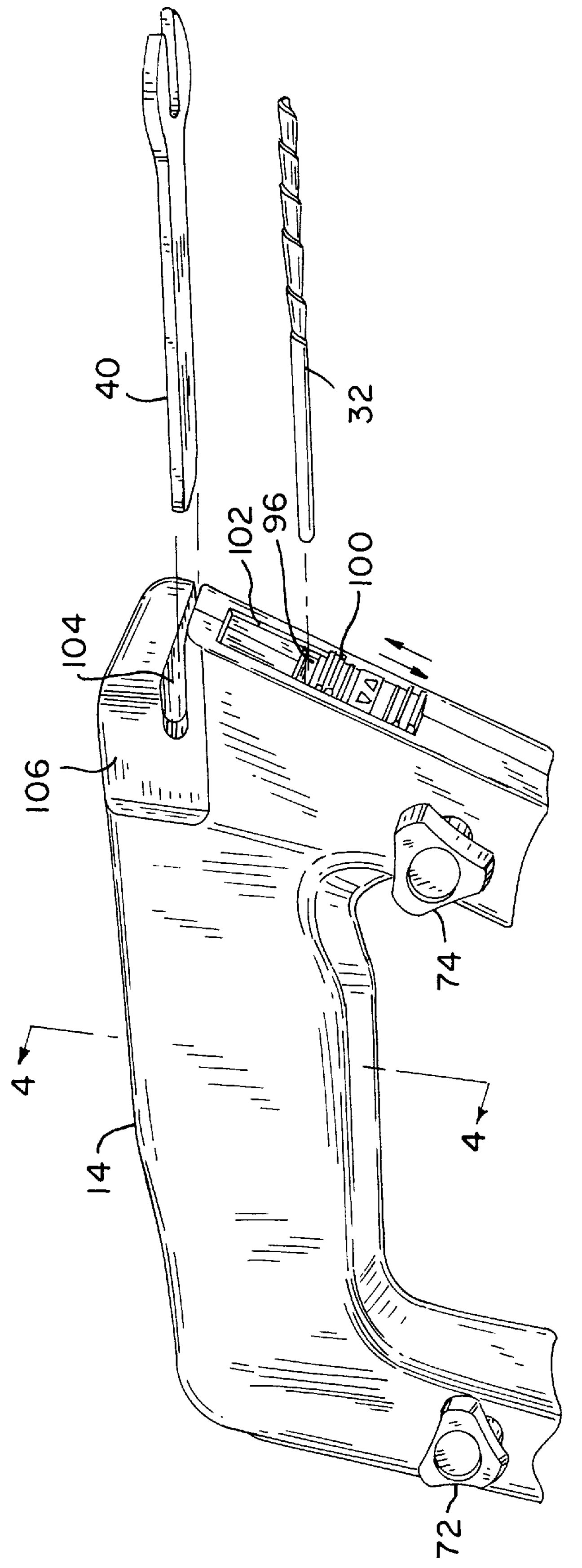
FIG. 3 is a perspective view of a detachable handle for a spiral cutting tool in accordance with the present invention.

Note that the structural elements 76 of the molded handle 14 not only provide strength and rigidity to the handle 14, but also form hollow compartments or chambers 86 within the handle 14. Compartments formed by the structural elements 76 of the handle 14 may be positioned so as to be employed for convenient storage locations. For example, as illustrated in FIGS. 3 and 4, spiral cutting tool bits 32 and the wrench 40 for tightening the collet nut 34 may conveniently be stored in compartments 90 and 92, respectively, inside the handle 14. A third compartment 94 may be provided for storage of, for example, extra collets 36.

Storage compartments 90 and 94 are accessed via apertures 96 and 98, respectively, in the wall of the handle 14. To prevent objects stored in the compartments 90 and 94 from sliding out during use of the spiral cutting tool 10, a sliding door 100 may preferably be provided. The sliding door 100 rides in a channel 102 provided on each half of the handle 14. Detents (not shown) may preferably be provided within the channel 102 to hold the sliding door 100 in various positions along the channel 102. When the sliding door 100 is positioned centrally along the channel 102, both storage compartments 90 and 94 are closed off (apertures 96 and 98 are covered), securing any items, such as the bit 32, stored therein. When the sliding door 100 is moved to a position near the end of the handle 14, as illustrated in FIG. 3, the storage compartment 90 is opened and accessible. Items such as the bit 32 may then be inserted into or removed from the compartment 90. When the sliding door 100 is moved to the opposite end of the channel 102, the compartment 94 is open and accessible. When compartment 90 is open, compartment 94 is closed, and when compartment 94 is open, compartment 90 is closed.

The other accessible handle compartment 92 may preferably be specifically designed to hold the wrench 40 within the handle 14 when it is not in use. An aperture 104 in the handle 14 provides access to the wrench compartment 92. The size of the compartment 92 is such that the wrench 40 is held snugly therein, to prevent it from sliding out during operation of the cutting tool 10. As illustrated in FIGS. 1 and 3, a portion 106 of the handle 14 around the aperture 104 to the wrench compartment 92 is reduced in width such that, when the wrench 40 is placed in the compartment 92, the head of the wrench extends slightly from the sides of the handle 14. This permits the head of the wrench 40 to be grasped to pull the wrench 40 from the compartment 92.

The compartments in the power tool handle 14 allow power tool accessories, such as extra cutting tool bits 32, to be kept conveniently at hand, and separate from other tools and accessories. It should be noted that various storage compartments of different sizes and shapes than those previously described may be incorporated into the handle 14. Also, various types of doors or other covers may be used to close off or access the compartments. Moreover, it is clear that a user may store any items he chooses within the storage compartments 90 and 94. In the embodiment described herein, however, one compartment 92 is specifically designed to hold the wrench 40.

The present invention facilitates the safe, accurate, and convenient operation and use of a spiral cutting tool 10. For the most accurate use of the spiral cutting tool 10, the detachable handle 14 is secured to the tool housing 12. This is accomplished by placing the ends of the handle 14 over the housing lugs 60 and 62, aligning the mounting holes 68 and 70 in the handle 14 with the holes 64 and 66 in the lugs 60 and 62, placing the threaded knobs 72 and 74 through the mounting holes 68 and 70 in the handle 14, and threading the knobs 72 and 74 into the threaded holes 64 and 66 in the lugs 60 and 62. The knobs 72 and 74 are tightened to secure the handle 14 to the housing 12.

A conveniently accessible spiral cutting tool bit 32 may be removed from the storage compartment 90 within the handle 14 by sliding open the sliding door 100. The conveniently located wrench 40 is removed from its storage compartment 92 in the handle 14 by firmly grasping the head of the wrench 40 and pulling it from the compartment 92.

To attach the bit 32 to the cutting tool 10, the shaft lock pin 42 is depressed, to keep the motor shaft 28 from rotating. The wrench 40 is then used to loosen the collet nut 30, and the shank 38 of the bit 32 is placed in the central aperture of the collet 36. With the shaft lock pin 42 still depressed, the collet nut 30 is tightened, thereby tightening the collet 36 around the shank 38 of the bit 32, securing the bit 32 to the shaft 28 of the cutting tool 10. The shaft lock pin 42 may then be released, and the wrench 40 returned to its compartment 92 in the handle 14. The sliding door 100 is moved to a central position along the channel 102 of the handle 14 to close the compartments 90 and 94 in the handle 14 to secure any items enclosed therein during operation of the cutting tool. The depth guide 46 may be adjusted by loosening the depth guide locking knob 48, sliding the depth guide 46 axially to the desired depth of cut, and retightening the knob 48. The depth of cut is preferably set to about ⅛ inch greater than the thickness of the workpiece material to be cut.

The cutting tool 10 is now prepared for making a cut, and the cutting tool power cord 18 may be connected to a source of electrical power. While grasping the cutting tool 10 firmly with two hands, one hand grasped around the gripping surface 59 of the handle 14 and the other hand grasped around the motor housing 12, the on/off switch 22 is engaged to turn on the cutting tool 10. The spiral cutting tool bit 32 is thereby rotated at a high speed, e.g., 30,000 RPM, by the electric motor contained within the motor housing 12. The bit 32 may then be plunged into a workpiece to make a cut therein. A pilot hole or other mark may be used to guide the rotating spiral cutting tool bit 32 into the workpiece. Alternatively, the rotating bit 32 may be plunged into the workpiece material by starting the bit into the material at a 45° angle, and then slowly bringing the axis of the bit to a 90° angle to the material being cut. With the surface 58 of the depth guide 46 pressed against the workpiece surface, the spiral cutting tool 10 is moved in a direction perpendicular to the axis of the cutting tool to cut the workpiece by removing material therefrom. Grasping the spiral cutting tool 10 by both the handle 14 and the housing 12 allows a very accurate cut to be made. Use of the handle 14 also enhances user comfort, minimizing user fatigue, and allowing accurate cuts to be made over an extended period of operation of the cutting tool 10.

For operation of the cutting tool 10 in close quarters, the handle 14 may become an obstruction to the making of accurate cuts. For such operating conditions, the handle 14 may be detached by simply unthreading the locking knobs 72 and 74 from the threaded holes 64 and 66 in the lugs 60 and 62, and removing the threaded knobs 72 and 74 from the holes 64 and 66 in the lugs 60 and 62 and from the mounting holes 68 and 70 in the handle 14. The handle 14 may then be pulled away from the lugs 60 and 62, to remove the handle 14 from the housing 12.

Though described in detail herein with respect to a particular type of spiral cutting tool, it should noted that the present invention is not limited in application to any particular spiral cutting tool design. The detachable handle of the present invention may be used with other types of spiral cutting tools, or similar hand-held power tools of the type wherein material is removed from a workpiece by positioning the axis of the power tool housing perpendicular to a surface of the workpiece, and moving the power tool housing along the surface of the workpiece in a direction perpendicular to the axis of the power tool housing. For example, the detachable handle of the present invention may also be applicable to hand-held routers or similar power tools.

It is thus understood that this invention is not confined to the particular embodiments herein illustrated and described, but embraces such modified forms thereof as come within the scope of the following claims.

What is claimed is:

1. An improved hand held power tool of the type including a power tool housing enclosing means for rotating a shaft extending from an end of the power tool housing along an axis thereof and means for attaching a bit to the shaft, and wherein the power tool is used to remove material from a workpiece by positioning the axis of the power tool housing perpendicular to a surface of the workpiece and moving the power tool housing in a direction perpendicular to the axis of the housing and parallel to the surface of the workpiece to cause the rotating bit to be moved through the workpiece in a direction perpendicular to an axis of the bit to remove material from the workpiece, the improvement comprising:

(a) a handle having first and second handle ends and a gripping surface; and (b) means for attaching and detaching the handle by hand at each of the first and second handle ends to the power tool housing such that the handle gripping surface is substantially parallel to the axis of the power tool housing.

2. The improved hand held power tool of claim 1 wherein the hand held power tool is a spiral cutting tool including means for attaching a spiral cutting tool bit to the shaft.

3. The improved hand held power tool of claim 1 wherein the means for attaching and detaching the handle to the power tool housing includes lugs extending from the power tool housing and means for attaching and detaching the handle ends to the lugs.

4. The improved hand held power tool of claim 3 wherein the means for attaching and detaching the handle ends to the lugs includes threaded holes through the lugs, mounting holes through the handle ends that are positioned thereon to be aligned with the threaded holes through the lugs, and threaded knobs adapted to be inserted through the mounting holes on the handle ends and threaded into the threaded holes through the lugs to attach the handle ends to the lugs.

5. The improved hand held power tool of claim 1 wherein the handle includes at least one storage compartment accessible through an aperture in the handle.

6. An improved hand held power tool of the type including a power tool housing enclosing means for rotating a shaft extending from an end of the power tool housing along an axis thereof and means for attaching a bit to the shaft, and wherein the power tool is used to remove material from a workpiece by positioning the axis of the power tool housing perpendicular to a surface of the workpiece and moving the power tool housing in a direction perpendicular to the axis of the housing and parallel to the surface of the workpiece to cause the rotating bit to be moved through the workpiece in a direction perpendicular to an axis of the bit to remove material from the workpiece, the improvement comprising:

(a) a handle having handle ends and a gripping surface and at least one storage compartment accessible through an aperture in the handle wherein the aperture in the handle is covered by a sliding door attached to the handle; and (b) means for detachably attaching the handle at the handle ends to the Power tool housing such that the handle gripping surface is substantially parallel to the axis of the power tool housing.

7. The improved hand held power tool of claim 6 wherein the handle includes a first storage compartment accessible through a first aperture in the handle, a second storage compartment accessible through a second aperture in the handle, and wherein the sliding door attached to the handle is capable of being slid into a first position wherein the first aperture is covered and the second aperture is open, a second position wherein both the first and second apertures are covered, and a third position wherein the first aperture is open and the second aperture is covered.

8. The improved hand held power tool of claim 1 wherein the handle is made of glass filled nylon.

9. A spiral cutting tool, comprising:

(a) a spiral cutting tool housing enclosing means for rotating a shaft extending from an end of the spiral cutting tool housing along an axis thereof and having first and second handle lugs extending therefrom;

(b) means for attaching a spiral cutting tool bit to the shaft whereby the spiral cutting tool is used to cut a workpiece by positioning the axis of the spiral cutting tool housing perpendicular to a surface of the workpiece and moving the spiral cutting tool housing in a direction perpendicular to the axis of the housing and parallel to the surface of the workpiece to cause the rotating spiral cutting tool bit to be moved through the workpiece in a direction perpendicular to an axis of the spiral cutting tool bit to remove material from the workpiece;

(c) a handle having first and second handle ends and a gripping surface; and (d) means for attaching and detaching the handle by hand at each of the handle ends to the handle lugs on the spiral cutting tool housing such that the handle gripping surface is substantially parallel to the axis of the spiral cutting tool housing.

10. The spiral cutting tool of claim 9 wherein the means for attaching and detaching the handle ends to the lugs includes threaded holes through the lugs, mounting holes on the handle ends that are positioned thereon to be aligned with the threaded holes through the lugs, and threaded knobs adapted to be inserted through the mounting holes on the handle ends and threaded into the threaded holes through the lugs to attach the handle ends to the lugs.

11. The spiral cutting tool of claim 9 wherein the handle includes at least one storage compartment accessible through an aperture in the handle.

12. The spiral cutting tool of claim 11 wherein the storage compartment is adapted to receive and hold a spiral cutting tool bit.

13. A spiral cutting tool, comprising:

(a) a spiral cutting tool housing enclosing means for rotating a shaft extending from an end of the spiral cutting tool housing along an axis thereof and having handle lugs extending therefrom;

(b) means for attaching a spiral cutting tool bit to the shaft whereby the spiral cutting tool is used to cut a workpiece by positioning the axis of the spiral cutting tool housing perpendicular to a surface of the workpiece and moving the spiral cutting tool housing in a direction perpendicular to the axis of the housing and parallel to the surface of the workpiece to cause the rotating spiral cutting tool bit to be moved through the workpiece in a direction perpendicular to an axis of the spiral cutting tool bit to remove material from the workpiece;

(c) a handle having handle ends and a gripping surface and at least one storage compartment accessible through an aperture in the handle wherein the storage compartment is adapted to receive and snugly hold a wrench having a wrench head, and wherein a width of the handle adjacent to the aperture is smaller than a width of the wrench head so that the head of a wrench held in the storage compartment will extend from a side of the handle to allow a user to grasp the wrench head to remove the wrench from the storage compartment; and (d) means for detachably attaching the handle at the handle ends to the handle lugs on the spiral cutting tool housing such that the handle gripping surface is substantially parallel to the axis of the spiral cutting tool housing.

14. A spiral cutting tool, comprising:

(a) a spiral cutting tool housing enclosing means for rotating a shaft extending from an end of the spiral cutting tool housing alone an axis thereof and having handle lugs extending therefrom;

(b) means for attaching a spiral cutting tool bit to the shaft whereby the spiral cutting tool is used to cut a workpiece by positioning the axis of the spiral cutting tool housing perpendicular to a surface of the workpiece and moving the spiral cutting tool housing in a direction perpendicular to the axis of the housing and parallel to the surface of the workpiece to cause the rotating spiral cutting tool bit to be moved through the workpiece in a direction perpendicular to an axis of the spiral cutting tool bit to remove material from the workpiece;

(c) a handle having handle ends and a gripping surface and at least one storage compartment accessible through an aperture in the handle wherein the aperture in the handle is covered by a sliding door attached to the handle; and (d) means for detachably attaching the handle at the handle ends to the handle lugs on the spiral cutting tool housing such that the handle gripping surface is substantially parallel to the axis of the spiral cutting tool housing.

15. The spiral cutting tool of claim 14 wherein the handle includes a first storage compartment accessible through a first aperture in the handle, a second storage compartment accessible through a second aperture in the handle, and wherein the sliding door attached to the handle is capable of being slid into a first position wherein the first aperture is covered and the second aperture is open, a second position wherein both the first and second apertures are covered, and a third position wherein the first aperture is open and the second aperture is covered.

16. The spiral cutting tool of claim 9 wherein the handle is made of glass filled nylon.

17. A detachable handle for a spiral cutting tool, comprising:

(a) a gripping surface;

(b) first and second handle ends connected to the gripping surface and including mounting structures adapted for attaching and detaching the handle by hand at each of the handle ends to a housing of the spiral cutting tool such that the handle gripping surface is substantially parallel to an axis of the spiral cutting tool housing; and (c) at least one storage compartment within the handle and accessible through an aperture in the handle.

18. The detachable handle of claim 17 wherein the mounting structures include mounting holes in the handle ends adapted to be aligned with threaded holes through lugs extending from the housing of the spiral cutting tool and adapted to receive threaded knobs therethrough that are threaded into the threaded holes through the lugs to attach the handle ends to the lugs.

19. The detachable handle of claim 17 wherein the storage compartment is adapted to receive and hold a spiral cutting tool bit.

20. A detachable handle for a spiral cutting tool, comprising:

(a) a gripping surface;

(b) handle ends connected to the gripping surface and including mounting structures adapted for detachably attaching the handle at the handle ends to a housing of the spiral cutting tool such that the handle gripping surface is substantially parallel to an axis of the spiral cutting tool housing; and (c) at least one storage compartment within the handle and accessible through an aperture in the handle wherein the storage compartment is adapted to receive and snugly hold a wrench having a wrench head, and wherein a width of the handle adjacent to the aperture is smaller than a width of the wrench head so that the head of a wrench held in the storage compartment will extend from a side of the handle to allow a user to grasp the wrench head to remove the wrench from the storage compartment.

21. A detachable handle for a spiral cutting tool, comprising:

(a) a gripping surface;

(b) handle ends connected to the gripping surface and including mounting structures adapted for detachably attaching the handle at the handle ends to a housing of the spiral cutting tool such that the handle gripping surface is substantially parallel to an axis of the spiral cutting tool housing; and (c) at least one storage compartment within the handle and accessible through an aperture in the handle wherein the aperture in the handle is covered by a sliding door attached to the handle.

22. The detachable handle of claim 21 wherein the handle includes a first storage compartment accessible through a first aperture in the handle, a second storage compartment accessible through a second aperture in the handle, and wherein the sliding door attached to the handle is capable of being slid into a first position wherein the first aperture is covered and the second aperture is open, a second position wherein both the first and second apertures are covered, and a third position wherein the first aperture is open and the second aperture is covered.

23. The detachable handle of claim 27 wherein the handle is made of glass filled nylon.

* * * * *